Patented July 21, 1942

2,290,281

UNITED STATES PATENT OFFICE 2,290,281

SUBSTITUTED AMINE DERIVATIVES

Henry R. Henze, Austin, Tex., assignor to Parke, Davis & Company, Detroit, Mich., a corporation of Michigan No Drawing. Application April 17, 1940,
Serial No. 330,063

10 Claims. (Cl. 260—309)

The invention relates to a new class of aliphatic tertiary amines in which one of the alkyl groups attached to the nitrogen atom of the amine is a methyl radical a hydrogen atom of which is replaced by a hydantoin radical. More especially, the invention refers to the new class of compounds of the following general formula;

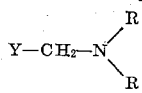

where the R groups represent saturated or unsaturated alkyl radicals, each R being the same for a given compound, Y being a 5-methyl-hydantoin radical attached to the methylene group (—$CH_2$—) of the above general formula by the number 5 carbon atom of the hydantoin nucleus. The compounds of the invention may therefore also be represented by the following formula;

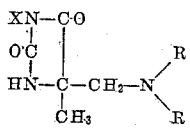

where the R groups have the same value as given above and X represents a member of the group hydrogen, an alkali metal, an alkaline earth metal and magnesium.

In addition to the compounds of the formula given above, the invention also embodies the mineral acid and organic acid salts of those amines wherein X is hydrogen.

The new compounds of the invention may readily be obtained by reacting a dialkyl amino acetone with an alkali cyanide and ammonium carbonate. The dialkyl substituted amino acetones used have the general formula;

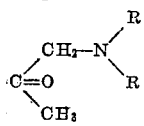

where the R groups have the same value as given for the above formula of the final products.

The following examples will serve to illustrate the invention.

Example 1

101 grams of dimethylamino acetone, prepared by reaction of dimethylamine with bromoacetone and having a boiling point of 31.6° C. (corrected) at 27 mm. pressure of mercury, is placed in a flask fitted with an air condenser and 3 moles of freshly powdered ammonium carbonate and 1.3 moles of potassium cyanide added along with 7 to 8 volumes of water. The mixture is heated for about 8 hours. Near the end of the period of heating, the condenser tube is removed and the temperature of the bath increased to evaporate the reaction mixture down to about one-half to one-third of its volume. It is then cooled in an ice-salt mixture to cause a separation of the substituted hydantoin. After filtering off the hydantoin compound, only a small amount of additional compound is obtained by exactly neutralizing the filtrate with dilute hydrochloric acid. The combined quantities of the product, 5-methyl-5-dimethylaminomethyl hydantoin, are recrystallized from dilute alcohol by concentration and cooling. The hydantoin of this example melts at 177° C.

Analysis:
Calculated: N—24.55%; C—49.11%; H—7.65%
Found: N—24.64%; C—49.14%; H—7.67%

The hydantoin of this example can be treated with equivalent amounts of a mineral acid such as hydrochloric acid, sulfuric acid, boric acid, phosphoric acid, etc., or an organic carboxylic acid such as acetic acid, lactic acid, citric acid, tartaric acid, benzoic acid, etc., to form salts of the hydantoin amine. In these amine salt compounds, X of the general formula is hydrogen.

Instead of forming the amine salts of the compound of this example, I can also react a basic solution of an alkali metal or alkaline earth metal or magnesium compound with the hydantoin, or its amine salts, to form hydantoinates in which X of the general formula given is an alkali or alkaline earth metal or magnesium group. In such hydantoinates the amine group,

is present as such and not in the form of an amine salt group. These two types of salts of the new amines of the invention may be represented by the formulas,

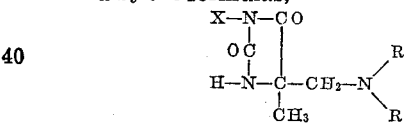

Hydantoinate salts (X=alkali metal, alkaline earth metal or Mg)

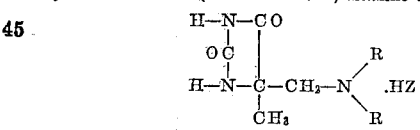

Amine salts (Z=anion of an acid)

Example 2

The di-allyl substituted amino acetone intermediate of this example is a new compound and is made as follows.

To 97 grams of di-allyl amine (1.0 mole) suspended in 5 volumes of water containing 2 moles of sodium carbonate, is added 1.0 mole of bromoacetone with vigorous stirring during four hours or until the odor of bromoacetone can no longer be recognized. After filtration from the sodium bicarbonate formed, the filtrate is extracted with ether and the product is obtained by drying the ether extract and evaporating off the ether. This di-allyl aminoacetone boils at 80.7° C. (corrected) at a pressure of 22 mm. of mercury. Its density is $d^{20}_4=0.889$.

One mole of the diallyl amino acetone thus prepared is heated for about 7 hours at 55–60° C. with 3 moles of ammonium carbonate and 1.3 moles of potassium cyanide in about 8 volumes of 50% alcohol. At the end of the heating, the reaction mixture is evaporated to a smaller volume and cooled to cause separation of 5-methyl-5-(di-allylaminomethyl) hydantoin. This product is filtered off and can be recrystallized, if desired, from a suitable solvent such as dilute alcohol by concentration of the solution and cooling. The 5-methyl-5-(di-allylaminomethyl) hydantoin has a melting point of 135° C. (corrected). It is obtained in more than 90% yields, especially if the hydantoin is recovered by neutralizing the filtrate from the reaction mixture as described under Example 1.

The compound of this example analyzes practically the theoretical for nitrogen, hydrogen and carbon as required for the formula,

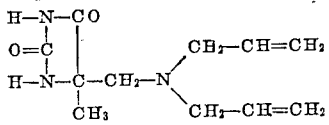

The hydantoin-substituted amine of this example can be converted to its amine salts with acids or to its hydantoinate salts with basic or alkaline compounds of alkali metals, or alkaline earth metals or magnesium in the manner given under Example 1.

*Example 3*

The di-isoamyl substituted aminoacetone intermediate of this example is made as follows:

To 314 grams of di-isoamylamine (2 moles) dissolved in 20 volumes of ether is added 136.9 grams (1.0 mole) of bromoacetone diluted with two volumes of ether. A precipitate of di-isoamylamine hydrobromide begins to form immediately and the reaction is completed by allowing the reactants to stand at room temperature or by refluxing the mixture in a warm water bath for a short time. The separated di-isoamylamine hydrobromide is removed from the ether solution by filtration. The filtrate is then concentrated by distillation. The di-isoamylaminoacetone, collected by distillation in vacuo, has a boiling point of 78.7° C. (corrected) at 2 mm. of mercury pressure.

To convert the intermediate of this example to the desired hydantoin, 21.3 grams (0.1 mole) of di-isoamylaminoacetone is placed in a flask with 0.3 mole of ammonium carbonate (U. S. P.) and 8.46 grams (0.13 mole) of potassium cyanide in about 8 volumes of 50% alcohol and heated for 7 hours at 55–60°. At the end of the heating period, the reaction mixture is concentrated by distilling the solvent under reduced pressure. Upon cooling, the 5-methyl-5-di-isoamylaminomethyl hydantoin separates as crystals which upon recrystallization from methyl alcohol-water and drying melt at 204° C. (corrected). A yield of 98% of this product is obtained, based upon the quantity of di-isoamylaminoacetone employed.

The product of this example has the formula,

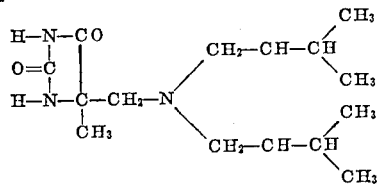

5-methyl-5-(di-isoamylaminomethyl) hydantoin

Calculated for $C_{15}H_{27}O_2N_3$; N, 14.83%; C, 63.57%; H, 10.29%. Found: N, 14.97%; C, 63.85%; H, 10.39%.

The hydantoinate salts and the amine salts of the compound of this example can be made as described under Example 1 or by equivalent procedures.

The above examples are merely illustrative and the invention is not limited to the specific compounds and details described in the examples. For instance, I have similarly prepared numerous other 5-methyl-5-(di-alkylaminomethyl) hydantoins, including the following:

*Disubstituted aminohydantoins*

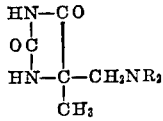

| —R— | —CH₂CH₃ | —CH₂CH₂CH₃ | —CH(CH₃)₂ | —CH₂CH₂CH₂CH₃ |
|---|---|---|---|---|
| M. P., °C. (corr.) | 196 | 161 | 198 | 173 |
| Nitrogen, percent: | | | | |
| Calcd | 21.09 | 18.49 | 18.49 | 16.46 |
| Found | 21.32 | 18.72 | 18.31 | 16.76 |
| Carbon, percent: | | | | |
| Calcd | 54.25 | 58.12 | 58.12 | 61.14 |
| Found | 54.02 | 58.23 | 58.26 | 61.30 |
| Hydrogen, percent: | | | | |
| Calcd | 8.60 | 9.31 | 9.31 | 9.87 |
| Found | 8.61 | 9.14 | 9.23 | 10.03 |

| —R— | —CH₂CH(CH₃)₂ | —CH(CH₃)CH₂CH₃ | —CH₂CH₂CH₂CH₂CH₃ |
|---|---|---|---|
| M. P., °C. (corr.) | 222 | 233 | 171 |
| Nitrogen, percent: | | | |
| Calcd | 16.46 | 16.46 | 14.83 |
| Found | 16.50 | ·16.60 | 15.04 |
| Carbon, percent: | | | |
| Calcd | 61.14 | 61.14 | 63.57 |
| Found | 61.24 | 61.20 | 63.74 |
| Hydrogen, percent: | | | |
| Calcd | 9.87 | 9.87 | 10.29 |
| Found | 9.79 | 9.77 | 10.29 |

The preferred compounds among the 5-methyl-5-dialkylaminomethyl hydantoins having the same or different R groups are those in which the alkyl has less than about six carbon atoms and which may be designated as lower alkyl compounds.

In addition to the compounds mentioned, other members may be similarly prepared. By starting with the corresponding dialkylamino acetone, prepared from chloro or bromo acetone and a dialkyl amine, and reacting it with alkali cyanide and ammonium carbonate, one can obtain 5-(di-octylaminomethyl)-5-methyl hydantoin, 5-(di-dodecylaminomethyl)-5-methyl hydantoin, other higher alkylaminomethyl derivatives, 5-(di-cinnamylaminomethyl)-5-methyl hydantoin, etc.

The invention in its broader aspects not only includes compounds of the formula,

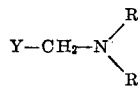

wherein each R is the same hydrocarbon group for a given compound, but also embodies those compounds in which the R groups are different hydrocarbon radicals. Some of the new compounds in which the R groups are different and which can be provided in accordance with this invention are:

the present invention is directed to a new class of compounds of the general formula,

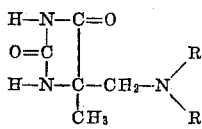

where the R groups are the same or different hydrocarbon radicals, as well as amine salts and hydantoinate salts of the same.

The compounds of this invention are useful as intermediates for the preparation of pharmaceutically useful compounds. Many of them are directly useful for therapeutic purposes, especially as anticonvulsants.

What I claim is:

1. A new class of compounds comprising hydantoin-substituted tertiary amines having the formula,

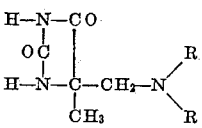

their corresponding amine salts of organic and mineral acids and the alkali, alkaline earth and magnesium hydantoinate salts of said amines, each of the R groups of a given compound representing the same alkyl radical.

*Disubstituted aminodimethylhydantoins*

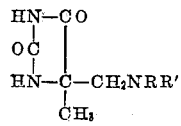

| —R | —C₆H₅ | —C₆H₅ | —CH₂C₆H₅ | —CH₂C₆H₅ | —CH₂C₆H₅ |
|---|---|---|---|---|---|
| —R′ | —CH₃ | —C₂H₅ | —C₆H₅ | —CH₃ | —C₂H₅ |
| M. P., °C. (corr.) | 190 | 171 | 213 | 204 | 165 |
| Nitrogen, percent: | | | | | |
| Calcd | 18.02 | 16.99 | 13.85 | 16.99 | 16.08 |
| Found | 17.96 | 17.02 | 13.90 | 17.08 | 16.22 |
| Carbon, percent: | | | | | |
| Calcd | 61.78 | 63.14 | 69.88 | 63.14 | 64.34 |
| Found | 61.94 | 63.35 | 70.07 | 63.37 | 64.51 |
| Hydrogen, percent: | | | | | |
| Calcd | 6.49 | 6.93 | 6.19 | 6.93 | 7.33 |
| Found | 6.55 | 6.99 | 6.65 | 7.17 | 7.61 |

| —R | —CH₂C₆H₅ | —CH₂C₆H₅ | —CH₂C₆H₄CH₃(o) | —CH₂C₆H₄—CH₃(p) | —C₆H₁₁ (Cyclohexyl) |
|---|---|---|---|---|---|
| —R′ | —C₃H₇—n | —C₄H₉—n | —CH₃ | —CH₃ | —CH₃ |
| M. P., °C. (corr.) | 157 | 169 | 177 | 178 | 199 |
| Nitrogen, percent: | | | | | |
| Calcd | 15.26 | 14.46 | 16.08 | 16.08 | 16.96 |
| Found | 15.40 | 14.61 | 16.19 | 16.19 | 17.09 |
| Carbon, percent: | | | | | |
| Calcd | 65.43 | 66.40 | 64.34 | 64.34 | 58.18 |
| Found | 65.59 | 66.61 | 64.51 | 64.48 | 58.30 |
| Hydrogen, percent: | | | | | |
| Calcd | 7.69 | 8.01 | 7.33 | 7.33 | 10.92 |
| Found | 7.86 | 8.14 | 7.59 | 7.62 | 10.98 |

Other compounds included in the present invention where the R groups are different are the methyl ethyl—, ethyl propyl—, ethyl amyl—, n-amyl n-butyl—, n-amyl isobutyl—, isoamyl n-butyl and isoamyl isobutylaminomethyl substituted 5-methyl hydantoins. The amine salts and hydantoinate salts of these latter compounds may also be obtained as previously described for the other hydantoins.

From the above description it will be seen that

2. New compounds comprising hydantoin-substituted tertiary amines of the formula,

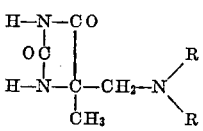

each of the R groups of the given compound representing the same alkyl radical.

3. New compounds comprising organic and mineral acid amine salts of hydantoin-substituted tertiary amines of the formula,

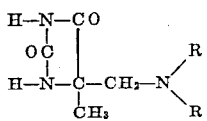

each of the R groups of the given compound representing the same alkyl radical.

4. New compounds comprising alkali, alkaline earth and magnesium hydantoinates salts of hydantoin-substituted tertiary amines of the formula,

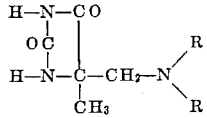

each of the R groups of the given compound representing the same alkyl radical.

5. A new class of compounds comprising hydantoin-substituted tertiary amines having the formula,

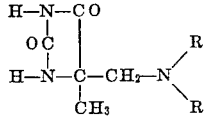

their corresponding amine salts of organic and mineral acids and the alkali, alkaline earth and magnesium hydantoinate salts of said amines, each of the R groups of a given compound representing the same lower alkyl radical.

6. New compounds comprising alkali metal hydantoinate salts of hydantoin-substituted tertiary amines of the formula,

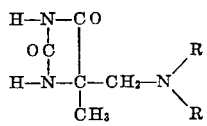

each of the R groups of a given compound representing the same lower alkyl radical.

7. The sodium hydantoinate salts of hydantoin-substituted tertiary amines of the formula,

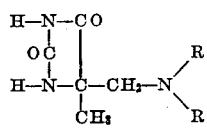

each of the R groups of a given compound representing the same alkyl radical.

8. A new class of compounds comprising hydantoin-substituted tertiary amines having the formula,

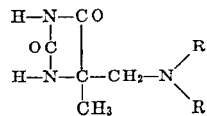

their corresponding amine salts of organic and mineral acids and the alkali, alkaline earth and magnesium hydantoinate salts of said amines, the R groups representing the same or different hydrocarbon radicals.

9. A new class of compounds comprising hydantoin-substituted tertiary amines having the formula,

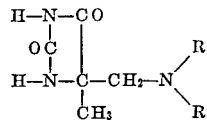

their corresponding amine salts of organic and mineral acids and the alkali, alkaline earth and magnesium hydantoinate salts of said amines, the R groups representing the same or different lower alkyl radicals.

10. The process of obtaining hydantoin-substituted tertiary amines of the formula,

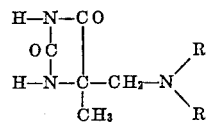

which comprises reacting an alkali metal cyanide and ammonium carbonate with a dialkylamino acetone of the formula,

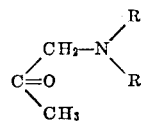

the R groups in both of the formulas given representing the same alkyl radicals for a given hydantoin-substituted amine and its corresponding amino acetone intermediate.

HENRY R. HENZE.